United States Patent
Sasai (10) Patent No.: US 9,403,274 B2
(45) Date of Patent: *Aug. 2, 2016

(54) ROBOTIC DEVICE AND METHOD OF CONTROLLING ROBOTIC DEVICE

(71) Applicant: Seiko Epson Corporation, Tokyo (JP)

(72) Inventor: Shigenori Sasai, Shiojiri (JP)

(73) Assignee: Seiko Epson Corporation (JP)

( * ) Notice: Subject to any disclaimer, the term of this patent is extended or adjusted under 35 U.S.C. 154(b) by 6 days.

This patent is subject to a terminal disclaimer.

(21) Appl. No.: 14/146,778

(22) Filed: Jan. 3, 2014

(65) Prior Publication Data

US 2014/0121832 A1 May 1, 2014

Related U.S. Application Data

(63) Continuation of application No. 13/179,894, filed on Jul. 11, 2011, now Pat. No. 8,649,904.

(30) Foreign Application Priority Data

Jul. 12, 2010 (JP) .................................. 2010-157633

(51) Int. Cl.
| | |
|---|---|
| G05B 19/18 | (2006.01) |
| B25J 9/16 | (2006.01) |
| B25J 13/08 | (2006.01) |
| G01C 25/00 | (2006.01) |
| G05B 9/03 | (2006.01) |

(52) U.S. Cl.
CPC .............. *B25J 9/1633* (2013.01); *B25J 9/1674* (2013.01); *B25J 13/088* (2013.01); *G01C 25/005* (2013.01); *G05B 9/03* (2013.01); *G05B 2219/40228* (2013.01)

(58) Field of Classification Search
CPC ...... B25J 13/088; B25J 9/1633; B25J 9/1674; G01C 25/005; G05B 9/03; G05B 2219/40228
USPC .................................................. 700/245–259
See application file for complete search history.

(56) References Cited

U.S. PATENT DOCUMENTS

| | | | |
|---|---|---|---|
| 7,366,587 B2 | 4/2008 | Iribe et al. | |
| 7,422,412 B2 * | 9/2008 | Akaha ........................ | 414/744.5 |

(Continued)

FOREIGN PATENT DOCUMENTS

| | | |
|---|---|---|
| JP | 60-195603 | 4/1985 |
| JP | 63-016982 | 1/1988 |

(Continued)

OTHER PUBLICATIONS

English_machine_translation for refrence JP2010064232.*

*Primary Examiner* — Jason Holloway
*Assistant Examiner* — Rachid Bendidi
(74) *Attorney, Agent, or Firm* — Harness, Dickey & Pierce, P.L.C.

(57) ABSTRACT

A robotic device having an arm including an actuator and inertial sensor, a first calculator adapted to calculate an angular velocity and an angular acceleration of the actuator based on a rotational angle data from an angle sensor, a second calculator adapted to calculate one of an angular velocity and an angular acceleration of the arm based on an output detected by the inertial sensor, and a comparator adapted to compare one of the angular velocity and the angular acceleration calculated by the first calculator and one of the angular velocity and the angular acceleration calculated by the second calculator with each other, and it is determined that the inertial sensor is at fault if an absolute value of the difference between the actuator and the arm in one of the angular velocity and the angular acceleration in the comparison section is larger than a threshold value.

4 Claims, 8 Drawing Sheets

(56) References Cited

U.S. PATENT DOCUMENTS

| | | | |
|---|---|---|---|
| 7,765,023 B2 | 7/2010 | Oaki et al. | |
| 7,975,545 B2* | 7/2011 | Noguchi et al. | 73/504.12 |
| 8,355,817 B2 | 1/2013 | Nihei et al. | |
| 2004/0167641 A1 | 8/2004 | Kawai et al. | |
| 2004/0176875 A1 | 9/2004 | Iribe et al. | |
| 2005/0246061 A1* | 11/2005 | Oaki et al. | 700/245 |
| 2009/0171504 A1 | 7/2009 | Hyung et al. | |
| 2009/0309531 A1* | 12/2009 | Hamahata | 318/565 |
| 2010/0148714 A1* | 6/2010 | Okita et al. | 318/561 |
| 2010/0194401 A1 | 8/2010 | Uemura | |
| 2010/0318223 A1* | 12/2010 | Motoyoshi et al. | 700/253 |

FOREIGN PATENT DOCUMENTS

| | | |
|---|---|---|
| JP | 01-173116 | 7/1989 |
| JP | 01-289688 A | 11/1989 |
| JP | 07-009374 | 1/1995 |
| JP | 2001-510890 A | 8/2001 |
| JP | 2002-144260 A | 5/2002 |
| JP | 2003-048180 A | 2/2003 |
| JP | 2003-150226 A | 5/2003 |
| JP | 2005-242794 A | 9/2005 |
| JP | 2008-022590 A | 1/2008 |
| JP | 2008-178959 A | 8/2008 |
| JP | 04-211898 B2 | 1/2009 |
| JP | 2009-008412 A | 1/2009 |
| JP | 2009-184035 A | 8/2009 |
| JP | 2009-241247 A | 10/2009 |
| JP | 2010-064232 A | 3/2010 |
| JP | 2010064232 A * | 3/2010 |
| JP | 2010-181259 A | 8/2010 |
| JP | 2010-181393 A | 8/2010 |
| JP | 2010-247303 A | 11/2010 |
| JP | 04955791 B2 | 6/2012 |

* cited by examiner

ROBOTIC DEVICE AND METHOD OF CONTROLLING ROBOTIC DEVICE

CROSS-REFERENCE TO RELATED APPLICATIONS

This is a continuation application of U.S. application Ser. No. 13/179,894 filed Jul. 11, 2011 which claims priority to Japanese Patent Application No. 2010-157633, filed Jul. 12, 2010 all of which are expressly incorporated by reference herein in their entireties.

BACKGROUND

1. Technical Field

The present invention relates to a robotic device, and a method of controlling a robotic device.

2. Related Art

A robotic device having a multijoint structure often used as a part of an IC handler or an assembling device has been in heavy usage in a variety of workplaces. Therefore, how fast and accurately the robotic device can move the arm to a desired position has been a performance specification and a quality of increasing significance for the robotic device.

In general, in order for moving the arm of the robotic device fast and accurately, it is preferable to reduce the inertial force acting on the arm to thereby prevent the load on the actuator for driving the arm from increasing. As one of the measures for reducing the inertial force acting on the arm, reduction in weight of the arm itself is used as an easy and effective measure. However, the reduction in weight of the arm results in degradation in the rigidity of the arm, and increases the generation of the vibration due to the deflection of the arm occurring when the arm stops. Therefore, if the tip portion of the arm is controlled to stop at a desired position, the displacement corresponding to the amplitude of the arm vibration is caused, and further, the damping time of the vibration is required as the waiting time until the subsequent action starts, which stands in the way of a high-speed operation.

In order for coping with this problem, there have been disclosed, for example, a method of disposing an acceleration sensor at the tip of the arm to operate the arm based on the acceleration signal, thus suppressing the vibration (e.g., JP-A-1-173116 (Document 1)), a method of disposing an angular velocity sensor at the tip of the arm and the arm itself to thereby controlling the arm operation based on the angular velocity signal (e.g., JP-A-2005-242794 (Document 2)), and a method of driving a driving body based on a signal of the inertial sensor disposed at the tip of the arm (e.g., JP-A-7-9374 (Document 3)).

However, in these related art documents, when the inertial sensor itself such as the acceleration sensor or the angular velocity sensor used as the standard of the arm control is at fault, even if the data signal obtained is faulty, the control based on the faulty signal is performed, which results in occurrence of danger due to runaway or the like of the robotic device. As a technology for detecting the failure of the sensor itself, it has been disclosed to previously set a threshold value with respect to the detection value of the sensor, and to determine that the sensor is at fault when the difference between the threshold value and the detected value exceeds a judgment value (JP-A-2009-8412 (Document 4), JP-A-2009-184035 (Document 5)).

However, according to the technology disclosed in the documents mentioned above, since the threshold value is previously set based on the detection value obtained when the sensor to be used operates normally, the detected value might fail to exceed the threshold value in a variety of actual operation states of the robotic device even if the sensor is at fault, which might fail to perform the accurate failure determination.

SUMMARY

An advantage of some aspects of the present invention is to provide a robotic device and a method of controlling a robotic device each performing comparison with a sensor detection data as a standard in the actual operation, and performing a reliable failure determination based on the difference of the detected data.

APPLICATION EXAMPLE 1

This application example of the invention is directed to a robotic device including: an arm linkage device including an actuator, a torque transmission mechanism with which a torque of the actuator is transmitted at a predetermined reduction ratio, and an angle sensor adapted to detect a rotational angle of the actuator, an arm body having a plurality of arms linked serially and rotatably with the arm linkage device, a base body to which the arm body is rotatably linked with a base body linkage device disposed on one end of the arm body and including an actuator, a torque transmission mechanism with which a torque of the actuator is transmitted at a predetermined reduction ratio, and an angle sensor adapted to detect a rotational angle of the actuator, an inertial sensor attached to the arm, a first calculation section adapted to calculate an angular velocity and an angular acceleration of the actuator based on a rotational angle data of the actuator from the angle sensor, a second calculation section adapted to calculate one of an angular velocity and an angular acceleration of the arm based on an output detected by the inertial sensor, a comparison section adapted to compare one of the angular velocity and the angular acceleration of the actuator calculated by the first calculation section and one of the angular velocity and the angular acceleration of the arm calculated by the second calculation section with each other, and a failure determination section adapted to determine that the inertial sensor is at fault and output a signal for halting an operation of the actuator if an absolute value of a difference between one of the angular velocity and the angular acceleration of the actuator and one of the angular velocity and the angular acceleration of the arm in the comparison section is larger than a predetermined threshold value $\Omega$.

APPLICATION EXAMPLE 2

This application example of the invention is directed to the robotic device of the above application example of the invention, wherein, assuming that if a load 120% of a maximum load of the robotic device is provided and the robotic device is operated at an acceleration 120% of an allowable acceleration with the maximum load, the angular velocity calculated by the first calculation section is $\omega_S$ and the angular velocity calculated by the second calculation section is $\omega_L$, the threshold value $\Omega$ is set as follows with respect to a maximum value of an absolute value of a difference between the angular velocities $\omega_S$ and $\omega_L$.

$$\Omega = 2 \times (|\omega_S - \omega_L|)_{max}$$

According to this application example of the invention, there is adopted a configuration in which the threshold for determining the standard value is not set to a constant value, but the failure of the inertial sensor is detected using the operation data of the actuator in the operation state as the standard value. Although there occurs the case in which the failure fails to be detected using a constant value as the threshold value if, for example, the operation speed or the acceleration is small, since according to this configuration the operation data to be the standard of the actuator used as the standard is also rewritten sequentially based on the sequential information in operation, the failure of the inertial sensor can surely be detected in a variety of operation modes, namely, even in a minute operation.

APPLICATION EXAMPLE 3

This application example of the invention is directed to a robotic device including: an arm linkage device including an actuator, and a torque transmission mechanism with which a torque of the actuator is transmitted at a predetermined reduction ratio, an arm body having a plurality of arms linked serially and rotatably with the arm linkage device, a base body to which the arm body is rotatably linked with a base body linkage device disposed on one end of the arm body and including an actuator, and a torque transmission mechanism with which a torque of the actuator is transmitted at a predetermined reduction ratio, at least two inertial sensors attached to the arm, a calculation section adapted to store a plurality of output values detected by the inertial sensors, and calculate an average value, a comparison section adapted to compare the average value of the output values calculated by the calculation section, and a failure determination section adapted to determine that at least either one of the inertial sensors is at fault and output a signal for halting an operation of the actuator if either one of absolute values of differences between the average values of the two output values is larger than a predetermined threshold value S in the comparison section.

APPLICATION EXAMPLE 4

This application example of the invention is directed to the robotic device of the above application example of the invention, wherein, assuming that a standard deviation of a white noise of the inertial sensor is σ, the threshold value S is set as follows.

$S = 6\sigma$

According to this application example of the invention, there is adopted a configuration in which the standard value for determining the threshold value is not set as a constant value, but the difference between the detection values of the two or more inertial sensors in the operation state is obtained, and if the difference is normal, the failure of the inertial sensor is detected by using the standard deviation of the white noise as the standard value. Although there occurs the case in which the failure fails to be detected using a constant value as the threshold value if, for example, the operation speed or the acceleration is small, since according to this configuration the operation data of inertial sensor to be compared with the standard value is also rewritten sequentially based on the sequential information in operation, the failure of the inertial sensor can surely be detected in a variety of operation modes, namely, even in a minute operation.

APPLICATION EXAMPLE 5

This application example of the invention is directed to a robotic device including: a base body including a base body actuator, a torque transmission mechanism with which a torque of the base body actuator is transmitted at a predetermined reduction ratio, a base body angle sensor adapted to detect a rotational angle of the base body actuator, and an arm driving device having an arm linkage device and coupled to the torque transmission mechanism to thereby drive the arm linkage device in a linearly reciprocating manner, an arm coupled to the arm linkage device, and including an arm actuator, a torque transmission mechanism with which a torque of the arm actuator is transmitted at a predetermined reduction ratio, an arm angle sensor adapted to detect a rotational angle of the arm actuator, and a work holding device driving device having a work holding device and coupled to the arm linkage device to thereby drive the work holding device in a linearly reciprocating manner, at least two inertial sensor attached to the work holding device, and including at least an acceleration sensor, a first calculation section adapted to calculate an acceleration of the arm driving device based on the rotational angle data of the base body actuator from the base body angle sensor, and an acceleration of the work holding device driving device based on the rotational angle data of the arm actuator from the arm angle sensor, a second calculation section adapted to calculate accelerations of the work holding device based on outputs detected by the inertial sensors, a comparison section adapted to compare the accelerations calculated by the first calculation section and the accelerations calculated by the second calculation section with each other, and a failure determination section adapted to determine that the inertial sensor is at fault and output a signal for halting operations of the base body actuator and the arm actuator if an absolute value of a difference between the acceleration calculated by the first calculation section and the acceleration calculated by the second calculation section is larger than a predetermined threshold value A.

APPLICATION EXAMPLE 6

This application example of the invention is directed to the robotic device of the above application example of the invention, wherein, assuming that if a load 120% of a maximum load of the robotic device is provided and the robotic device is operated at an acceleration 120% of an allowable acceleration with the maximum load, the acceleration calculated by the first calculation section is $\alpha_S$ and the acceleration calculated by the second calculation section is $\alpha_L$, the threshold value A is set as follows with respect to a maximum value of an absolute value of a difference between the accelerations $\alpha_S$ and $\alpha_L$.

$A = 2 \times (|\alpha_S - \alpha_L|)_{max}$

According to this application example of the invention, there is adopted a configuration in which the threshold for determining the standard value is not set to a constant value, but the failure of the inertial sensor is detected using the operation data of the actuator in the operation state as the standard value. Although there occurs the case in which the failure fails to be detected using a constant value as the threshold value if, for example, the operation speed or the acceleration is small, since according to this configuration the operation data to be the standard of the actuator used as the standard is also rewritten sequentially based on the sequential information in operation, the failure of the inertial sensor can surely be detected in a variety of operation modes, namely, even in a minute operation.

APPLICATION EXAMPLE 7

This application example of the invention is directed to a method of controlling a robotic device including: providing an arm linkage device including an actuator, a torque transmission mechanism with which a torque of the actuator is transmitted at a predetermined reduction ratio, and an angle sensor adapted to detect a rotational angle of the actuator, an arm body having a plurality of arms linked serially and rotatably with the arm linkage device, and a base body to which the arm body is rotatably linked with a base body linkage device disposed on one end of the arm body and including an actuator, a torque transmission mechanism with which a torque of the actuator is transmitted at a predetermined reduction ratio, and an angle sensor adapted to detect a rotational angle of the actuator, providing an inertial sensor attached to the arm, calculating an angular velocity and an angular acceleration of the actuator based on a rotational angle data of the actuator from the angle sensor, and one of an angular velocity and an angular acceleration of the arm based on an output detected by the inertial sensor, comparing one of the angular velocity and the angular acceleration of the actuator calculated in the calculating and one of the angular velocity and the angular acceleration of the arm with each other, determining that the inertial sensor is at fault if an absolute value of a difference between one of the angular velocity and the angular acceleration of the actuator and one of the angular velocity and the angular acceleration of the arm in the comparing is larger than a threshold value $\Omega$, and outputting a signal for halting an operation of the actuator if it is determined in the determining that the inertial sensor is at fault.

APPLICATION EXAMPLE 8

This application example of the invention is directed to the method of controlling a robotic device of the above application example of the invention, wherein, assuming that if a load 120% of a maximum load of the robotic device is provided and the robotic device is operated at an acceleration 120% of an allowable acceleration with the maximum load, the angular velocity calculated in the calculating is $\omega_S$ and the angular velocity is $\omega_L$, the threshold value $\Omega$ is set as follows with respect to a maximum value of an absolute value of a difference between the angular velocities $\omega_S$ and $\omega_L$.

$$\Omega = 2 \times (|\omega_S - \omega_L|)_{max}$$

According to this application example of the invention, there is adopted a configuration in which the threshold for determining the standard value is not set to a constant value, but the failure of the inertial sensor is detected using the operation data of the actuator in the operation state as the standard value. Although there occurs the case in which the failure fails to be detected using a constant value as the threshold value if, for example, the operation speed or the acceleration is small, since according to this configuration the operation data to be the standard of the actuator used as the standard is also rewritten sequentially based on the sequential information in operation, the failure of the inertial sensor can surely be detected in a variety of operation modes, namely, even in a minute operation, and therefore, the operation of the robotic device can surely be halted, thus the safeguard of the safe operation can be provided.

APPLICATION EXAMPLE 9

This application example of the invention is directed to a method of controlling a robotic device including providing an arm linkage device including an actuator, and a torque transmission mechanism with which a torque of the actuator is transmitted at a predetermined reduction ratio, an arm body having a plurality of arms linked serially and rotatably with the arm linkage device, and a base body to which the arm body is rotatably linked with a base body linkage device disposed on one end of the arm body and including an actuator, and a torque transmission mechanism with which a torque of the actuator is transmitted at a predetermined reduction ratio, providing at least two inertial sensors attached to the arm, calculating an average value using a plurality of output values detected by the inertial sensors stored, comparing the average value of the output values calculated in the calculating, determining that at least either one of the inertial sensors is at fault if at least one absolute value of the difference of the average values of the two output values in the comparing is larger than a predetermined threshold value S, and outputting a signal for halting an operation of the actuator if it is determined in the determining that the inertial sensor is at fault.

APPLICATION EXAMPLE 10

This application example of the invention is directed to the method of controlling a robotic device of the above application example of the invention, wherein, assuming that a standard deviation of a white noise of the inertial sensor is $\sigma$, the threshold value S is set as follows.

$$S = 6\sigma$$

According to this application example of the invention, there is adopted a configuration in which the standard value for determining the threshold value is not set as a constant value, but the difference between the detection values of the two or more inertial sensors in the operation state is obtained, and if the difference is normal, the failure of the inertial sensor is detected by using the standard deviation of the white noise as the standard value. Although there occurs the case in which the failure fails to be detected using a constant value as the threshold value if, for example, the operation speed or the acceleration is small, since according to this configuration the operation data of inertial sensor to be compared with the standard value is also rewritten sequentially based on the sequential information in operation, the failure of the inertial sensor can surely be detected in a variety of operation modes, namely, even in a minute operation, and therefore, the operation of the robotic device can surely be halted, thus the safeguard of the safe operation can be provided.

APPLICATION EXAMPLE 11

This application example of the invention is directed to a method of controlling a robotic device including: providing a base body including a base body actuator, a torque transmission mechanism with which a torque of the base body actuator is transmitted at a predetermined reduction ratio, a base body angle sensor adapted to detect a rotational angle of the base body actuator, and an arm driving device having an arm linkage device and coupled to the torque transmission mechanism to thereby drive the arm linkage device in a linearly reciprocating manner, and an arm coupled to the arm linkage device, and including an arm actuator, a torque transmission mechanism with which a torque of the arm actuator is transmitted at a predetermined reduction ratio, an arm angle sensor adapted to detect a rotational angle of the arm actuator, and a work holding device driving device having a work holding device and coupled to the arm linkage device to thereby drive the work holding device in a linearly reciprocating manner, calculating an acceleration of the arm driving device based on the rotational angle data of the base body actuator from the base body angle sensor, an acceleration of the work holding device driving device based on the rotational angle data of the arm actuator from the arm angle sensor, and a velocity and an acceleration of the work holding device based on outputs detected by at least one inertial sensor attached to the work holding device and including at least an acceleration sensor, comparing the accelerations of the arm driving device and the work holding device driving device and the acceleration of the work holding device with each other, determining that the inertial sensor is at fault if an absolute value of a difference between the accelerations of the arm driving device and the work holding device driving device calculated based on the output values of the angle sensors and the acceleration of the work holding device calculated based on the output value of the inertial sensor in the comparing is larger than a predetermined threshold value A, and outputting a signal for halting operations of the base body actuator and the arm actuator if it is determined in the determining that the inertial sensor is at fault.

APPLICATION EXAMPLE 12

This application example of the invention is directed to the method of controlling a robotic device of the above application example of the invention, wherein, assuming that if a load 120% of a maximum load of the robotic device is provided and the robotic device is operated at an acceleration 120% of an allowable acceleration with the maximum load, the acceleration of one of the arm driving device and the work holding device driving device calculated in the calculating is $\alpha_S$ and the acceleration of the work holding device is $\alpha_L$, the threshold value A is set as follows with respect to a maximum value of an absolute value of a difference between the accelerations $\alpha_S$ and $\alpha_L$.

$$A = 2 \times (|\alpha_S - \alpha_L|)_{max}$$

According to this application example of the invention, there is adopted a configuration in which the threshold for determining the standard value is not set to a constant value, but the failure of the inertial sensor is detected using the operation data of the actuator in the operation state as the standard value. Although there occurs the case in which the failure fails to be detected using a constant value as the threshold value if, for example, the operation speed or the acceleration is small, since according to this configuration the operation data to be the standard of the actuator used as the standard is also rewritten sequentially based on the sequential information in operation, the failure of the inertial sensor can surely be detected in a variety of operation modes, namely, even in a minute operation, and therefore, the operation of the robotic device can surely be halted, thus the safeguard of the safe operation can be provided.

BRIEF DESCRIPTION OF THE DRAWINGS

The invention will be described with reference to the accompanying drawings, wherein like numbers reference like elements.

FIGS. 1A and 1B are diagrams showing a robotic device according to a first embodiment of the invention, wherein

FIGS. 4A and 4B are diagrams showing a robotic device according to a second embodiment of the invention, wherein

DESCRIPTION OF EXEMPLARY EMBODIMENTS

Some embodiments according to the invention will hereinafter be explained with reference to the accompanying drawings.

First Embodiment

Figure 1A:
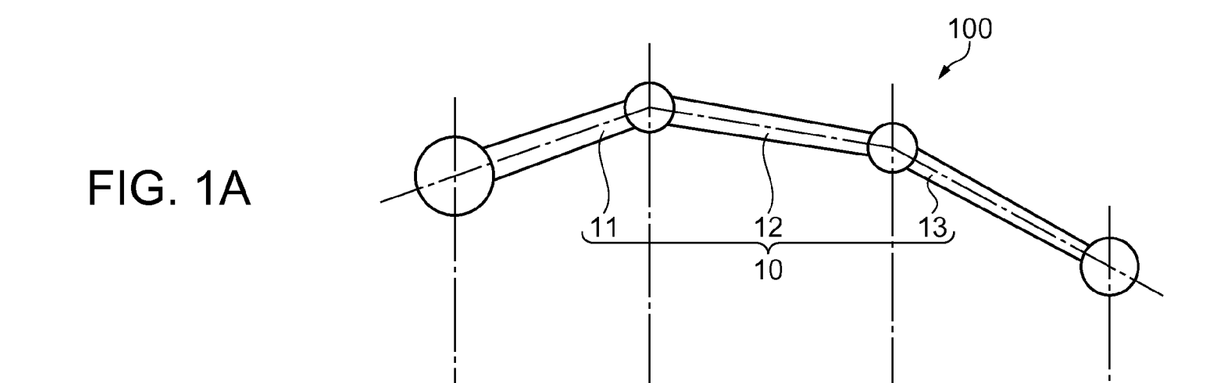
FIG. 1A shows a schematic plan view.
Figure 1B:
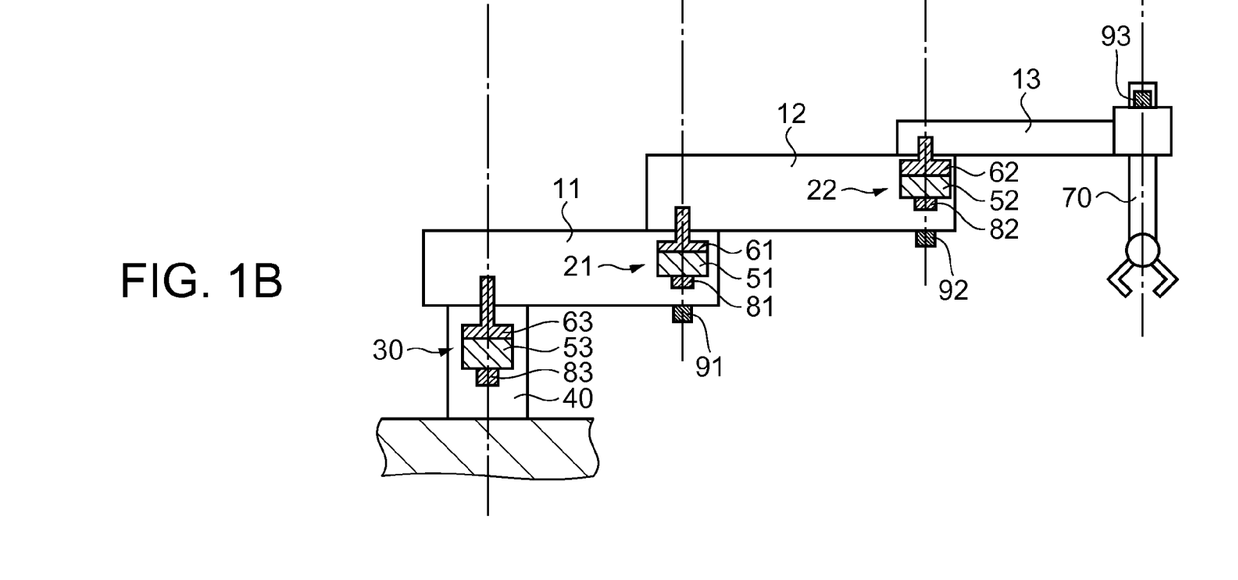
FIG. 1B shows a schematic cross-sectional view.

The first embodiment according to the invention will be explained. FIGS. 1A and 1B are diagrams showing a robotic device according to the first embodiment, wherein FIG. 1A shows a schematic plan view, and FIG. 1B shows a schematic cross-sectional view. The robotic device according to the present embodiment is a so-called three-axis horizontal articulated robot 100 (hereinafter referred to as a robotic device 100) having three arms linked rotatably in a horizontal direction.

The robotic device 100 is provided with an arm body 10 configured by rotatably and serially linking a first arm 11 and a second arm 12 with a first arm linkage device 21, and the second arm 12 and a third arm 13 with a second arm linkage device 22. The arm body 10 is further linked rotatably to a base body 40, which is fixed to a substrate, with a base body linkage device 30, and thus the robotic device 100 is constituted.

The first arm linkage device 21 includes an actuator 51, and a torque transmission device 61 for transmitting the torque of the actuator 51 at a predetermined reduction ratio, and the second arm linkage device 22 also includes an actuator 52, and a torque transmission device 62 similarly thereto. Further, the base body linkage device 30 includes an actuator 53, and a torque transmission device 63 for transmitting the torque of the actuator 53 at a predetermined reduction ratio. The tip portion of the third arm 13, which is the tip portion of the arm body 10 on the opposite side to the base body 40, is provided with a work holding device 70 for holding a working tool or an object to be worked.

The actuator 51 included in the first arm linkage device 21 is provided with an angle sensor 81 for detecting the rotational angle, and similarly, the actuator 52 of the second arm linkage device is provided with an angle sensor 82. Further, the base body linkage device 30 is also provided with an angle sensor 83 in the actuator 53. Further, the first arm 11, the second arm 12, and the third arm 13 are respectively provided with inertial sensors 91, 92, and 93. The inertial sensors 91, 92, and 93 are each include at least an angular velocity sensor, and are arranged to be able to detect the angular velocities of the first, second, and third arms 11, 12, and 13 at positions to which the inertial sensors 91, 92, and 93 are attached, respectively.

Figure 2:
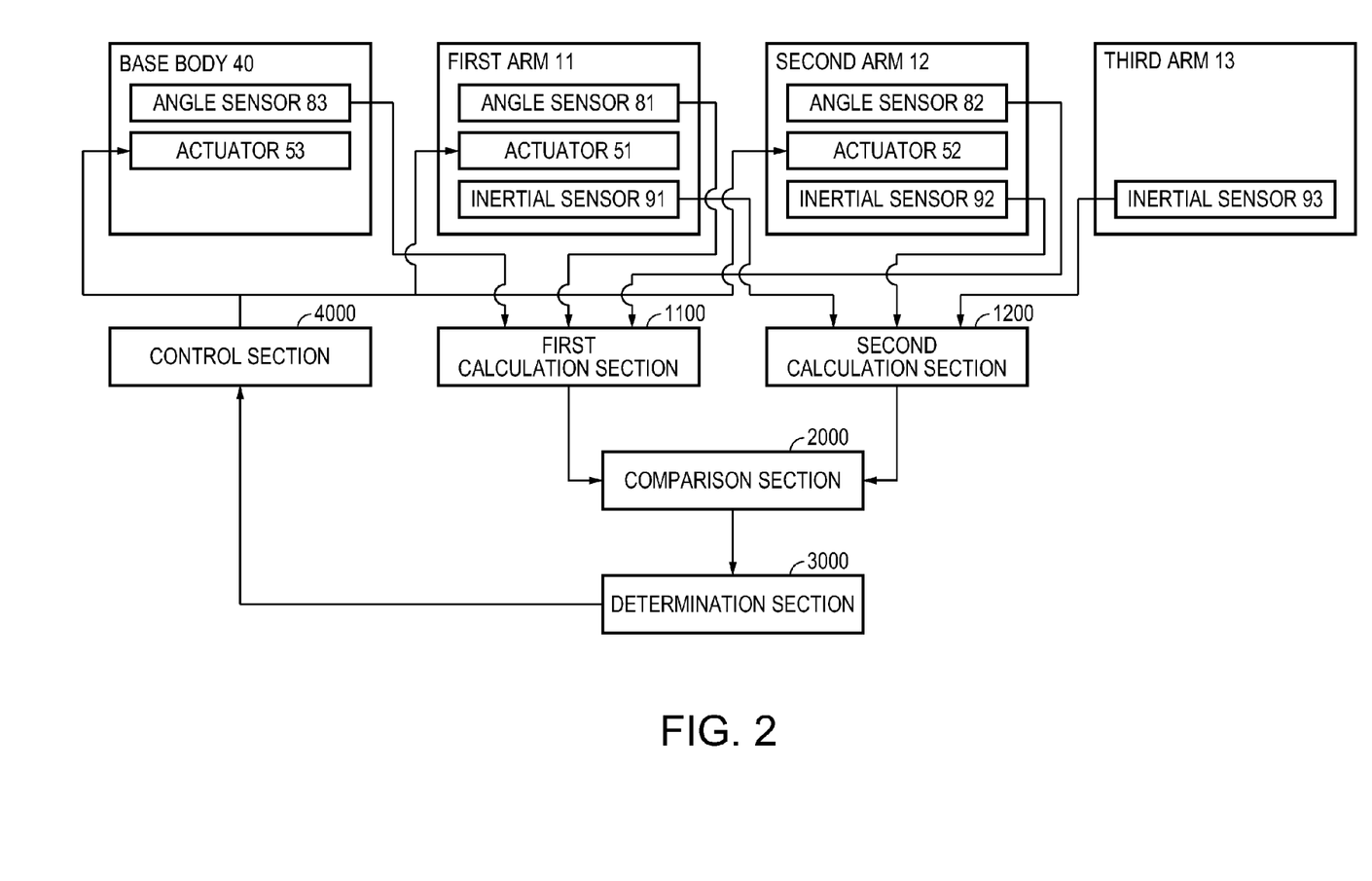
FIG. 2 is a block diagram of failure detection of the robotic device according to the first embodiment.

FIG. 2 is a block diagram according to the present embodiment. The rotational angle data of the actuators 51, 52, and 53 detected by the angle sensors 81, 82, and 83 is converted by the first calculation section 1100 into the rotational angles, and first-order temporal differentiation is performed on the rotational angles to thereby calculate the angular velocities.

The second calculation section 1200 calculates the angular velocity $\omega_{a1}$ of the first arm 11, the angular velocity $\omega_{a2}$ of the second arm 12, and the angular velocity $\omega_{a3}$ of the third arm 13 based on the data detected by the inertial sensors 91, 92, and 93 provided to the first arm 11, the second arm 12, and the third arm 13, respectively.

A comparison section 2000 compares the angular velocities calculated in the first calculation section 1100 and the angular velocities calculated in the second calculation section 1200. As the method of comparing the angular velocities, there is performed a calculation for obtaining the difference between the angular velocity of each of the actuators and a real angular velocity obtained by eliminating the angular velocity component of the linkage device provided with the actuator from the angular velocity component of the inertial sensor provided to the arm linked to the actuator.

The explanation will be presented using the second arm 12 as an example. Assuming that the angle obtained from the detection data of the angle sensor 81 of the first arm linkage device 21 with which the second arm 12 is linked to the first arm 11 is θ1, the reduction ratio of the torque transmission device 61 is N1, since the angular velocity obtained from the detection value of the inertial sensor 91 provided to the first arm 11 is $\omega_{a1}$, and the angular velocity obtained from the detection value of the inertial sensor 92 provided to the second arm 12 is $\omega_{a2}$, the comparison section obtains the following absolute value as a comparison result.

$$|(\omega_{a2}-\omega_{a1})-d\theta1/dt \times 1/N1| \tag{1-1}$$

Here, t denotes time. The differentiation value dθ1/dt is calculated in the first calculation section 1100, and the formula 1-1 can be rewritten as follows assuming the angular velocity of the actuator 51 of the first arm linkage device 21 thus calculated as ω1.

$$|(\omega_{a2}-\omega_{a1})-\omega1 \times 1/N1| \tag{1-2}$$

A determination section 3000 determines whether or not the target inertial sensor operates normally based on the comparison result obtained by the comparison section 2000, namely the value of the formula 1-1 in, for example, the second arm 12. The determination section 3000 previously stores the threshold value (the judgment value) for the failure determination in a storage device not shown, and performs the determination on whether or not it operates normally based on the level of the comparison result with respect to the threshold value.

Similarly, regarding to the arms other than the second arm 12 described above as an example, the absolute values to be the comparison results corresponding to the formula 1-1 with respect to the first arm 11 and the third arm 13 are as follows.

In the case of the first arm 11, the absolute value is as follows.

$$|\omega_{a1}-\omega3 \times 1/N3| \tag{1-3}$$

The reference symbol $\omega_{a1}$ denotes the angular velocity obtained from the detection value of the inertial sensor 91 provided to the first arm 11, the reference symbol ω3 denotes the angular velocity calculated from the detection value of the angle sensor 83 provided to the actuator 53 of the base body linkage device 30, and the reference symbol N3 denotes the reduction ratio of the torque transmission device 63 of the base body linkage device 30.

In the case of the third arm 13, the absolute value is as follows.

$$|(\omega_{a3}-\omega_{a2})-\omega2 \times 1/N2| \tag{1-4}$$

The reference symbol $\omega_{a3}$ denotes the angular velocity obtained from the detection value of the inertial sensor 93 provided to the third arm 13, the reference symbol $\omega_{a2}$ denotes the angular velocity obtained from the detection value of the inertial sensor 92 provided to the second arm 12, the reference symbol ω2 denotes the angular velocity calculated from the detection value of the angle sensor 82 provided to the actuator 52 of the second arm linkage device 22, and the reference symbol N2 denotes the reduction ratio of the torque transmission device 62 of the second arm linkage device 22.

Here, the threshold values will be explained. The threshold values are set using the angular velocities as the standards, the angular velocities being calculated from the angle data detected by the angle sensors 81, 82, and 83 of the actuators 51, 52, and 53 provided to the first arm linkage device 21, the second arm linkage device 22, and the base body linkage device 30 to be the standard.

It is assumed that the threshold value of the failure determination of the inertial sensor 91 is Ω1, the threshold value of the failure determination of the inertial sensor 92 is Ω2, and the threshold value of the failure determination of the inertial sensor 93 is Ω3. The case of determining, for example, the threshold value Ω1 of the failure determination of the inertial sensor 91 provided to the first arm 11 will be explained.

The load, which is 120% of the maximum load, is provided to the robotic device 100, and the first arm 11 is operated at acceleration, which is 120% of the maximum allowable acceleration of the first arm 11 with the maximum load. The threshold value Ω1 is set as follows with respect to the maximum value of the absolute value of the difference between the angular velocity $\omega_{a1A}$ obtained from the output value of the inertial sensor 91 and the angular velocity $\omega_{m1A}$ obtained from the detection value of the angle sensor 83 provided to the actuator 53 of the base body linkage device 30 at the time point when T hour has elapsed from the beginning of the operation.

$$\Omega1 = 2 \times |\omega_{a1A}-\omega_{m1A}|_{max} \tag{1-5}$$

Similarly, the load, which is 120% of the maximum load, is provided to the robotic device 100, and the second arm 12 is operated at acceleration, which is 120% of the maximum allowable acceleration of the second arm 12 with the maximum load. The threshold value Ω2 is set as follows with respect to the maximum value of the absolute value of the difference between the angular velocity of the second arm 12 corresponding to the difference between the angular velocity $\omega_{a2A}$ obtained from the output value of the inertial sensor 92 and the angular velocity $\omega_{a1A}$ obtained from the output value of the inertial sensor 91, and the angular velocity $\omega_{m2A}$ obtained from the detection value of the angle sensor 81 provided to the actuator 51 of the first arm linkage device 21 at the time point when T hour has elapsed from the beginning of the operation.

$$\Omega2 = 2 \times |\omega_{a2A}-\omega_{a1A}-\omega_{m2A}|_{max} \tag{1-6}$$

Further, the load, which is 120% of the maximum load, is provided to the robotic device 100, and the third arm 13 is operated at acceleration, which is 120% of the maximum allowable acceleration of the third arm 13 with the maximum load. There can be obtained the threshold value having the threshold value ω3 set as follows with respect to the maximum value of the absolute value of the difference between the angular velocity of the third arm 13 corresponding to the difference between the angular velocity $\omega_{a3A}$ obtained from the output value of the inertial sensor 93 and the angular velocity $\omega_{a2A}$ obtained from the output value of the inertial sensor 92, and the angular velocity $\omega_{m3A}$ obtained from the detection value of the angle sensor 82 provided to the actuator 52 of the second arm linkage device 22 at the time point when T hour has elapsed from the beginning of the operation.

$$\Omega 3 = 2 \times |\omega_{a3A} - \omega_{a2A} - \omega_{m3A}|_{max} \quad (1\text{-}7)$$

Using the threshold values $\Omega 1$, $\Omega 2$, and $\Omega 3$ thus obtained, the failure of the inertial sensors are determined if the following conditions are fulfilled in comparison with the formulas 1-1, 1-2, and 1-3 described above.

The condition of the failure determination for the inertial sensor 91 is as follows.

$$|\omega_{a1} - \omega 3 \times 1/N3| > \Omega 1 \quad (1\text{-}8)$$

The condition of the failure determination for the inertial sensors 91, 92 is as follows.

$$|(\omega_{a2} - \omega_{a1}) - \omega 1 \times 1/N1| > \Omega 2 \quad (1\text{-}9)$$

The condition of the failure determination for the inertial sensors 92, 93 is as follows.

$$|(\omega_{a3} - \omega_{a2}) - \omega 2 \times 1/N2| >> \Omega 3 \quad (1\text{-}10)$$

Figure 3:
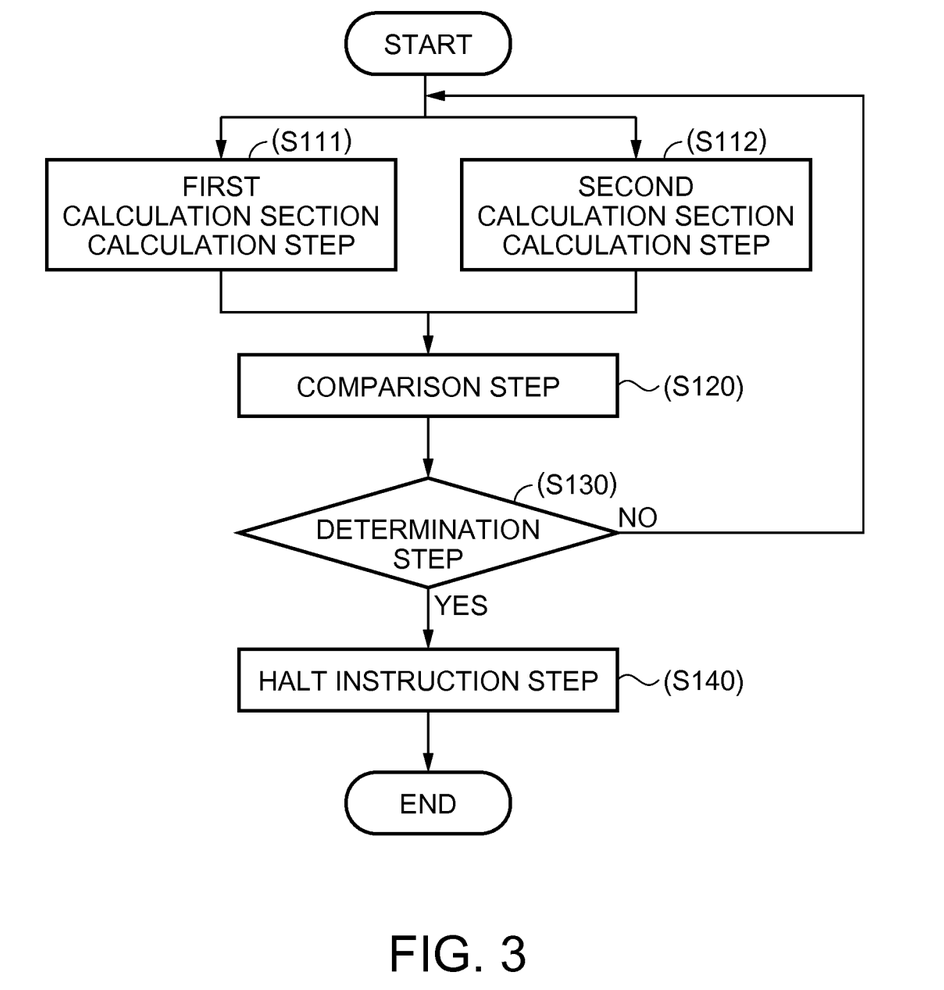
FIG. 3 is a flowchart of the failure detection of the robotic device according to the first embodiment.

Then, a control method according to the first embodiment will be explained. FIG. 3 is a flowchart for explaining the control method according to the first embodiment.

Firstly, in calculation steps (S111, S112), the detection values of the angle sensor and the inertial sensor are obtained, and the calculation for obtaining the angular velocity is performed. In the calculation step (S111) of the first calculation section 1100, the detection data of the angle sensors 81, 82, and 83 provided to the actuators 51, 52, and 53 provided to the arm linkage devices 21, 22 and the base body linkage device 30, respectively. The detection data thus obtained is converted into the angle data, and then the temporal differentiation is performed on the angle data thus converted to thereby calculate the angular velocity.

In the calculation step (S112) of the second calculation section 1200, the detection data of the inertial sensors 91, 92 provided to the first arm linkage device 21 and the second arm linkage device 22, and the detection data of the inertial sensor 93 provided to the work holding device 70 are obtained. The detection data thus obtained is converted into the angular velocity.

Subsequently, the process proceeds to a comparison step (S120) of comparing the angular velocity of the actuator calculated in the calculation steps S111, S112 and the angular velocity of the arm with each other. In the comparison step (S120), the calculation results of the formulas 1-2, 1-3, and 1-4 described above are output to a determination step (S130) subsequent thereto.

In the determination step (S130), it is determined whether or not the calculation results input from the comparison step (S120) are larger than the threshold values $\Omega 1$, $\Omega 2$, and $\Omega 3$ previously stored in a storage device not shown, respectively. If the determination result is "YES," namely, if the calculation results from the comparison step (S120) are larger than the respective threshold values, it is determined that the corresponding inertial sensors are at fault.

The explanation will be presented using the first arm 11 as an example. In the first arm 11, the failure determination of the inertial sensor 91 provided to the first arm 11 is performed taking the detection value of the angle sensor 83 provided to the base body linkage device 30 as the standard. The angular velocity $\omega_{a3}/N3$ of the first arm 11 calculated from the detection value of the angle sensor 83 in the calculation step (S111, S112) and the angular velocity $\omega 1$ of the first arm 11 obtained from the inertial sensor 91 are used in the comparison step (S120) for outputting the comparison result based on the formula 1-8 to thereby determine whether or not the value is larger than the threshold value $\Omega 1$ in the determination step (S130). In other words, if the formula 1-8 ($|\omega_{a1} - \omega 3 \times 1/N3| > \Omega 1$) is satisfied, it is determined that the inertial sensor 91 is at fault.

Similarly, in the second arm 12 and the third arm 13, if the formula 1-9 ($|\omega_{a2} - \omega_{a1}) - \omega 1 \times 1/N1| > \Omega 2$) is satisfied according to the determination result, it is determined that either one or both of the inertial sensor 91 and the inertial sensor 92 are at fault in the case of the second arm 12.

In the case of the third arm 13, if the formula 1-10 ($|(\omega_{a3} - \omega_{a2}) - \omega 2 \times 1/N2| > \Omega 3$) is satisfied, it is determined that either one or both of the inertial sensor 92 and the inertial sensor 93 are at fault.

If it is determined in the determination step (S130) that the sensors are not at fault (NO), the process returns to the calculation steps (S111, S112) again to repeat the failure determination of the inertial sensors.

If it is determined in the determination step (S130) that the sensor is at fault (YES), the process proceeds to a halt instruction step (S140). In the halt instruction step (S140), the command for halting the operations of the actuators 51, 52, and 53 is delivered to a control section 4000, and then the control section 4000 transmits the halt signals to the actuators 51, 52, and 53, and thus the operations are stopped. Specifically, the operation of the robotic device 100 is stopped. Subsequently, the inertial sensor determined to be at fault is detached from the robotic device, and then necessary repair or sensor replacement is performed.

As described above, since the angular velocity obtained from the detection data of the angle sensor of the actuator provided to each of the linkage devices is used as the determination standard of the failure of the inertial sensor, the determination standard itself is also a value varying in accordance with the action of the arm body 10, and the failure determination is performed using a more realistic action, and therefore, the accurate failure determination of the inertial sensor becomes possible. Thus, it becomes possible to surely avoid the danger due to the runaway of the robotic device, assure the stable operation of the robotic device due to early normalization, and keep the product quality high.

Second Embodiment

The second embodiment is different from the first embodiment only in the layout of the inertial sensors and the detection data to be the determination standard. Therefore, the explanation will be presented while providing the same constituents as those of the first embodiment with the same reference symbols.

Figure 4A:
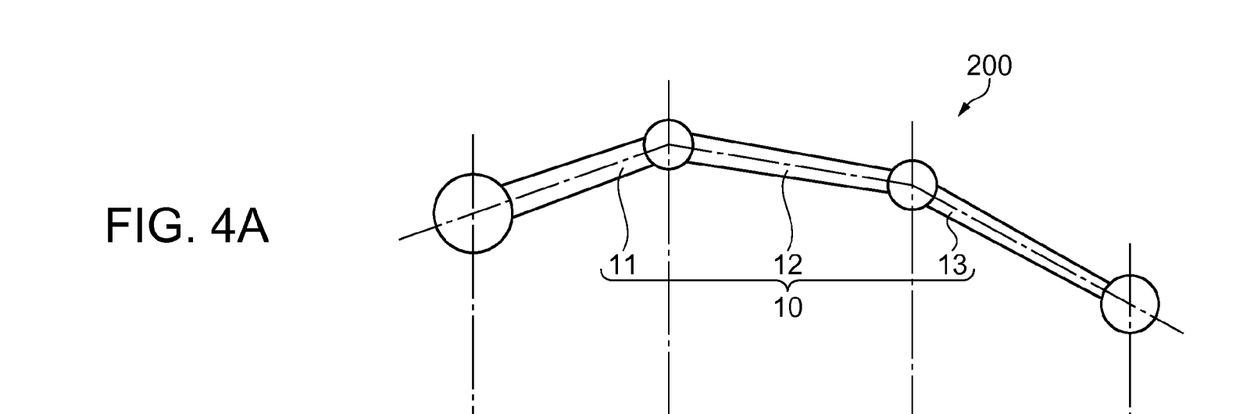
FIG. 4A shows a schematic plan view.
Figure 4B:
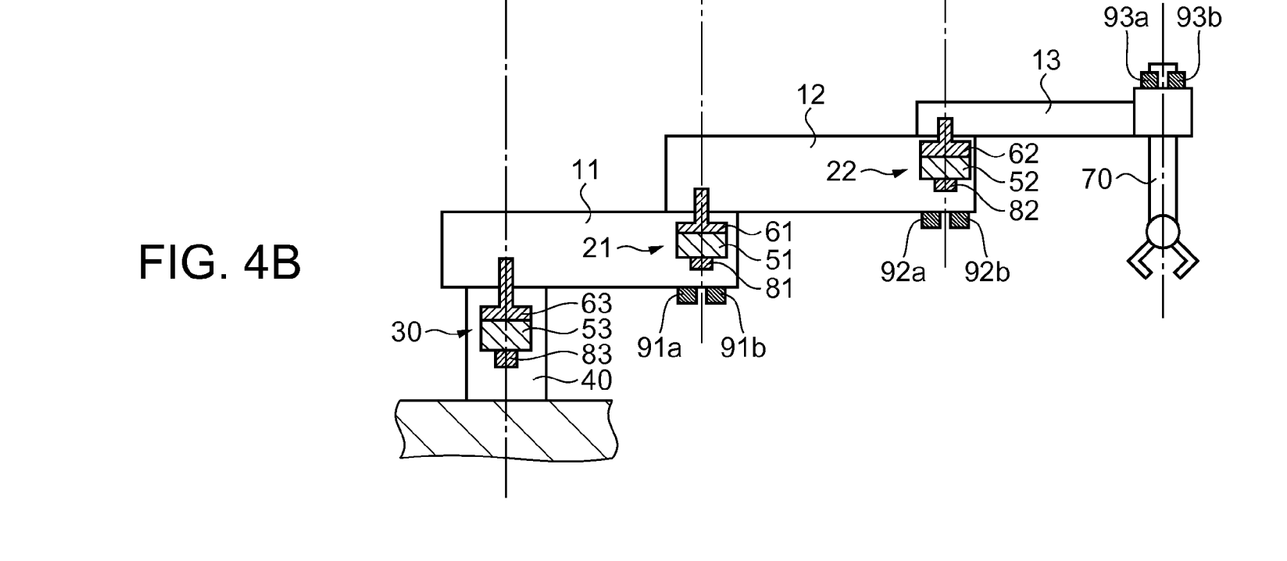
FIG. 4B shows a schematic cross-sectional view.

FIGS. 4A and 4B are diagrams showing a robotic device according to the second embodiment, wherein FIG. 4A shows a schematic plan view, and FIG. 4B shows a schematic cross-sectional view. The robotic device according to the present embodiment is a so-called three-axis horizontal articulated robot 200 (hereinafter referred to as a robotic device 200) having three arms linked rotatably in a horizontal direction.

The robotic device 200 according to the second embodiment is different from the robotic device 100 according to the first embodiment in the point that two inertial sensors are provided to each of the arms. The first arm 11 is provided with inertial sensors 91a, 91b, the second arm 12 is provided with inertial sensors 92a, 92b, and the third arm 13 is provided with inertial sensors 93a, 93b. These inertial sensors are disposed adjacent to each other, and further, those having equivalent standard performance are used as the inertial sensors.

Figure 5:
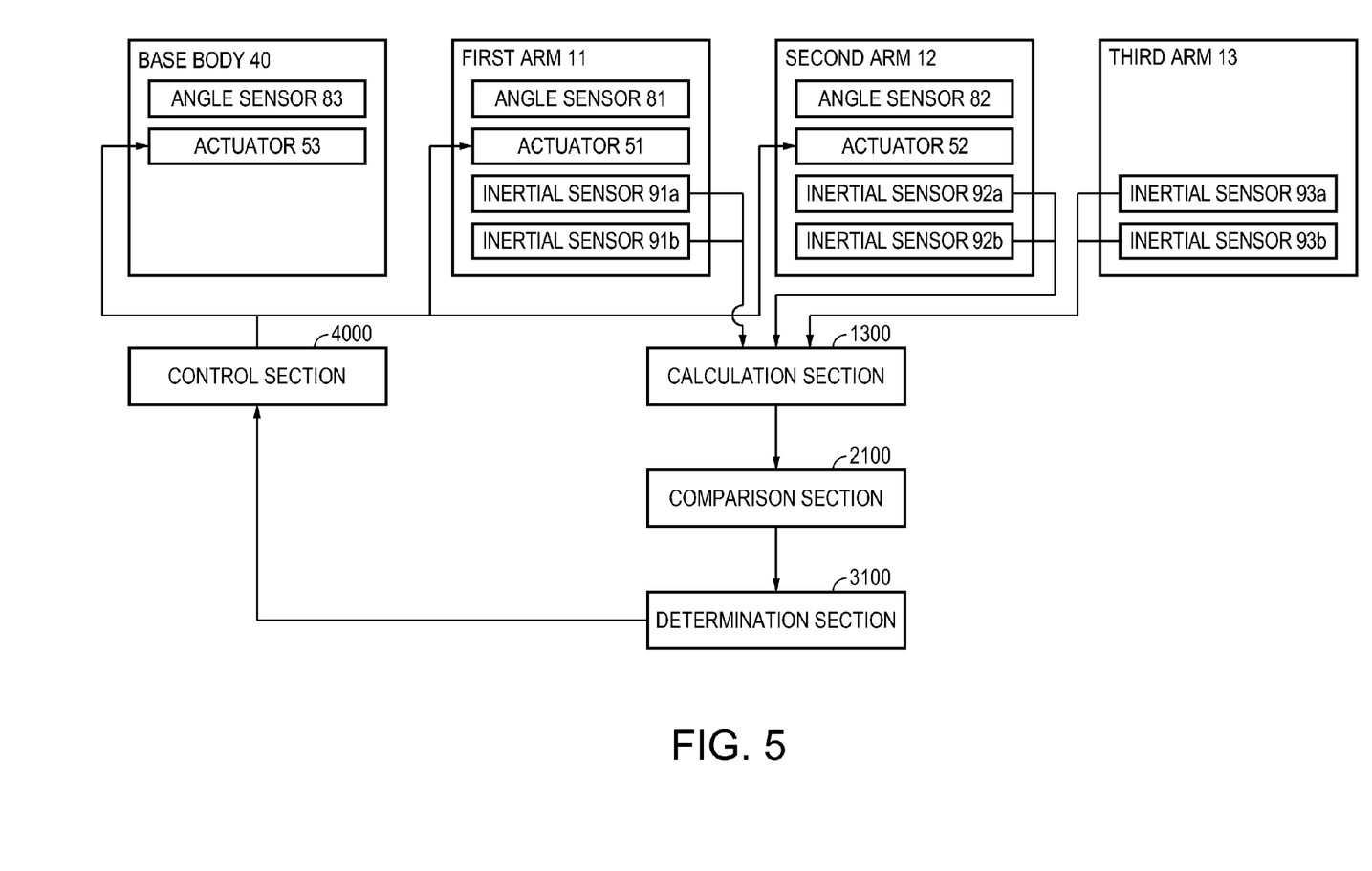
FIG. 5 is a block diagram of failure detection of the robotic device according to the second embodiment.

FIG. 5 is a block diagram according to the second embodiment. A calculation section 1300 obtains the detection data from the inertial sensors 91a, 91b, 92a, 92b, 93a, and 93b provided to the arm body 10 at each of the time points t1 through tn. Specifically, there are created n detection data $\alpha_{1a1}, \alpha_{1a2}, \alpha_{1a3}, \ldots \alpha_{1an}$ from the time point t1 to the time point tn in the inertial sensor 91a, n detection data $\alpha_{1b1}, \alpha_{1b2}, \alpha_{1b3}, \ldots \alpha_{1bn}$ from the time point t1 to the time point tn in the inertial sensor 91b, n detection data $\alpha_{2a1}, \alpha_{2a2}, \alpha_{2a3}, \ldots, \alpha_{2an}$ from the time point t1 to the time point tn in the inertial sensor 92a, n detection data $\alpha_{2b1}, \alpha_{2b2}, \alpha_{2b3}, \ldots \alpha_{2bn}$ from the time point t1 to the time point tn in the inertial sensor 92b, n detection data $\alpha_{3a1}, \alpha_{3a2}, \alpha_{3a3}, \ldots, \alpha_{3an}$ from the time point t1 to the time point tn in the inertial sensor 93a, and n detection data $\alpha_{3b1}, \alpha_{3b2}, \alpha_{3b3}, \ldots, \alpha_{3bn}$ from the time point t1 to the time point tn in the inertial sensor 93b.

The average value of the n detection data of each of the inertial sensors 91a, 91b, 92a, 92b, 93a, and 93b thus obtained is calculated. Specifically, the average values $\alpha_{1am}$, $\alpha_{1bm}, \alpha_{2am}, \alpha_{2bm}, \alpha_{3am}$, and $\alpha_{3bm}$ of the detection data of the inertial sensors 91a, 91b, 92a, 92b, 93a, and 93b are obtained as follows.

$$\alpha_{1am}=(\alpha_{1a1}+\alpha_{1a2}+\alpha_{1a3}+\ldots+\alpha_{1an})/n$$

$$\alpha_{1bm}=(\alpha_{1b1}+\alpha_{1b2}+\alpha_{1b3}+\ldots+\alpha_{1bn})/n$$

$$\alpha_{2am}=(\alpha_{2a1}+\alpha_{2a2}+\alpha_{2a3}+\ldots+\alpha_{2an})/n$$

$$\alpha_{2bm}=(\alpha_{2b1}+\alpha_{2b2}+\alpha_{2b3}+\ldots+\alpha_{2bn})/n$$

$$\alpha_{3am}=(\alpha_{3a1}+\alpha_{3a2}+\alpha_{3a3}+\ldots+\alpha_{3an})/n$$

$$\alpha_{3bm}=(\alpha_{3b1}+\alpha_{3b2}+\alpha_{3b3}+\ldots+\alpha_{3bn})/n$$

It should be noted that the number n of data to be obtained is preferably larger than 100, and can appropriately be determined based on the conditions such as the performance of the CPU used for the calculation.

A comparison section 2100 obtains the absolute value of the difference between the average values of the detection data of the inertial sensors adjacent to each other using the average values of the respective detection data thus obtained. In the first arm 11, for example, the inertial sensors 91a, 91b correspond to the inertial sensors adjacent to each other, and the absolute value $\alpha_{1d}$ of the difference between the average values of the detection data is obtained as follows.

$$|\alpha_{1am}-\alpha_{1bm}|=\alpha_{1d} \quad (2\text{-}1)$$

In a similar manner, regarding the second arm 12 and the third arm 13, the absolute values $\alpha_{2d}, \alpha_{3d}$ of the differences between the average values of the detection data of the inertial sensors adjacent to each other can be obtained as follows.

$$|\alpha_{2am}-\alpha_{2bm}|=\alpha_{2d} \quad (2\text{-}2)$$

$$|\alpha_{3am}-\alpha_{3bm}|=\alpha_{3d} \quad (2\text{-}3)$$

Subsequently, a determination section 3100 determines whether the inertial sensor to be the object is normal or at fault based on the absolute values $\alpha_{1d}, \alpha_{2d}$, and $\alpha_{3d}$ of the differences between the average values of the detection data of the respective inertial sensors as the comparison result obtained by the comparison section 2100. The determination section 3100 previously stores the threshold value for the failure determination in a storage device not shown, and performs the determination on normal or failure based on the level of the comparison result with respect to the threshold value.

Figure 6:
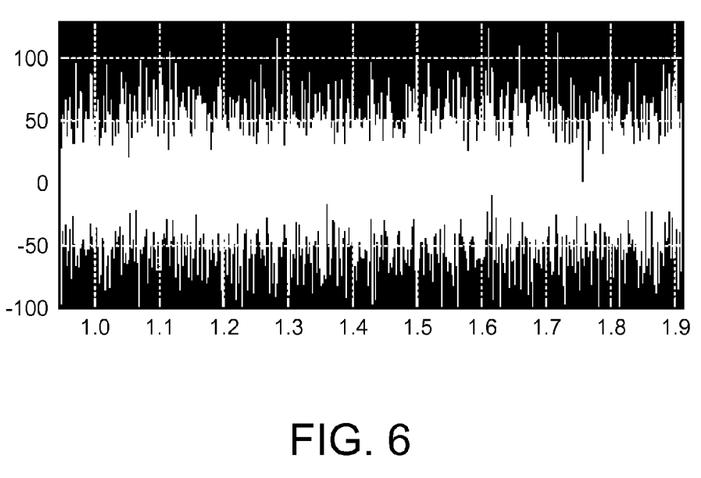
FIG. 6 is a graph showing an example of the white noise of the sensor.

The threshold values will be explained. The threshold values are determined in a manner as described below based on the characteristics of the respective inertial sensors. Specifically, the white noise of each of the inertial sensors is measured using the inertial sensors 91a, 91b, 92a, 92b, 93a, and 93b to be installed in the robotic device 200 or unused inertial sensors of the same standards as the inertial sensors 91a, 91b, 92a, 92b, 93a, and 93b to be installed. The white noise has a waveform of randomly vibrating as shown in, for example, FIG. 6. The standard deviation of the white noise of each of the inertial sensors to be measured is obtained.

For example, the threshold value for the inertial sensors 91a, 91b provided to the first arm 11 can be obtained as follows. The standard deviation $\sigma1$ is obtained from the value of the white noise measured using the inertial sensors 91a, 91b to be installed in the robotic device 200 or the unused inertial sensors having the same standard as the inertial sensors 91a, 91b. The threshold value S1 of the failure determination of the inertial sensors 91a, 91b provided to the first arm 11 is set as follows using the standard deviation $\sigma1$ thus obtained as a standard.

$$S1=6\times\sigma1$$

Similarly, the threshold value S2 is set as follows based on the standard deviation $\sigma2$ of the white noise of the inertial sensors 92a, 92b provided to the second arm 12, and the threshold value S3 is set as follows based on the standard deviation $\sigma3$ of the white noise of the inertial sensors 93a, 93b provided to the third arm 13.

$$S2=6\times\sigma2$$

$$S3=6\times\sigma3$$

The failure determination is performed whether the threshold values S1, S2, and S3 thus set as described above are larger or smaller than the absolute values $\alpha_{1d}, \alpha_{2d}$, and $\alpha_{3d}$ of the differences between the average values of the detection data of the respective inertial sensors obtained by the comparison section 2100 using the formulas 2-1, 2-2, and 2-3. Specifically, if $\alpha_{1d}>S1$ is satisfied, it is determined that either one or both of the inertial sensors 91a, 91b are at fault, if $\alpha_{2d}>S2$ is satisfied, it is determined that either one or both of the inertial sensors 92a, 92b are at fault, and if $\alpha_{3d}>S3$ is satisfied, it is determined that either one or both of the inertial sensors 93a, 93b are at fault.

Figure 7:
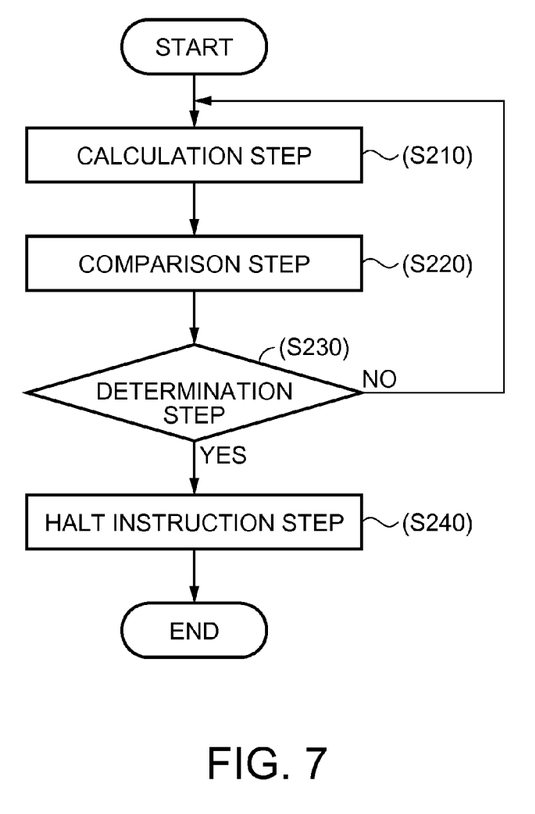
FIG. 7 is a flowchart of the failure detection of the robotic device according to the second embodiment.

Then, a control method according to the second embodiment will be explained. FIG. 7 is a flowchart for explaining the control method according to the second embodiment. Firstly, in a calculation step (S210), the detection data from each of the inertial sensors is obtained, and the average values $\alpha_{1am}, \alpha_{1bm}, \alpha_{2am}, \alpha_{2bm}, \alpha_{3am}$, and $\alpha_{3bm}$ of the detection data are calculated.

Then, the process proceeds to a comparison step (S220)

In the comparison step (S220), the absolute value $\alpha_{1d}$ of the difference between the average values $\alpha_{1am}$ and $\alpha_{1bm}$ of the detection data of the inertial sensors 91a, 91b adjacent to each other is calculated as a comparison value (the formula 2-1) using the average values $\alpha_{1am}, \alpha_{1bm}, \alpha_{2am}, \alpha_{2bm}, \alpha_{3am}$, and $\alpha_{3bm}$ of the detection data calculated in the calculation step (S210). Similarly, the absolute value $\alpha_{2d}$ of the difference between the average values $\alpha_{2am}$ and $\alpha_{2bm}$ of the detection data of the inertial sensors 92a, 92b adjacent to each other (the formula 2-2), and the absolute value $\alpha_{3d}$ of the difference between the average values $\alpha_{3am}$ and $\alpha_{3bm}$ of the detection data of the inertial sensors 93a, 93b adjacent to each other (the formula 2-3) are calculated as comparison values.

Then, the process proceeds to a determination step (S230). In the determination step (S230), it is determined whether or not the calculation results from the comparison step (S220) are larger than the threshold values S1, S2, and S3 previously stored in a storage device not shown, respectively. If the determination result is "YES," namely, if the calculation results from the comparison step (S220) are larger than the respective threshold values, it is determined that the corresponding inertial sensors are at fault.

The explanation will be presented using the first arm 11 as an example. In the first arm 11, the inertial sensors 91a, 91b are the objects of the determination, and if the absolute value $\alpha_{1d}$ of the difference of the average values of the detection data and the threshold value S1 satisfy $\alpha_{1d} > S1$, it is determined that either one or both of the inertial sensors 91a, 91b are at fault.

Similarly, in the second arm 12, if $\alpha_{2d} > S2$ is satisfied, it is determined that either one or both of the inertial sensors 92a, 92b are at fault, and in the third arm 13, if $\alpha_{3d} > S3$ is satisfied, it is determined that either one or both of the inertial sensors 93a, 93b are at fault.

If it is determined in the determination step (S230) that the sensors are not at fault (NO), the process returns to the calculation step (S210) again to repeat the failure determination of the inertial sensors.

If it is determined in the determination step (S230) that the sensor is at fault (YES), the process proceeds to a halt instruction step (S240). In the halt instruction step (S240), the command for halting the operations of the actuators 51, 52, and 53 is delivered to a control section 4000, and then the control section 4000 transmits the halt signals to the actuators 51, 52, and 53, and thus the operations are stopped. Specifically, the operation of the robotic device 200 is stopped. Subsequently, the inertial sensor determined to be at fault is detached from the robotic device, and then necessary repair or sensor replacement is performed.

As described above, what is used as the determination standard of the failure of the inertial sensors has arms each provided with at least two, namely a plurality of, inertial sensors, compares the outputs of the inertial sensors provided to the same arm, and uses the standard deviation of the white noise of the sensor as the determination standard, thus the accurate failure determination of the inertial sensors becomes possible. Thus, it becomes possible to surely avoid the danger due to the runaway of the robotic device, assure the stable operation of the robotic device due to early normalization, and keep the product quality high.

Third Embodiment

Although in the first embodiment and the second embodiment the explanation is presented using the so-called horizontal articulated robotic device, the failure determination of a sensor in a direct acting robotic device will be explained in the third embodiment.

Figure 8:
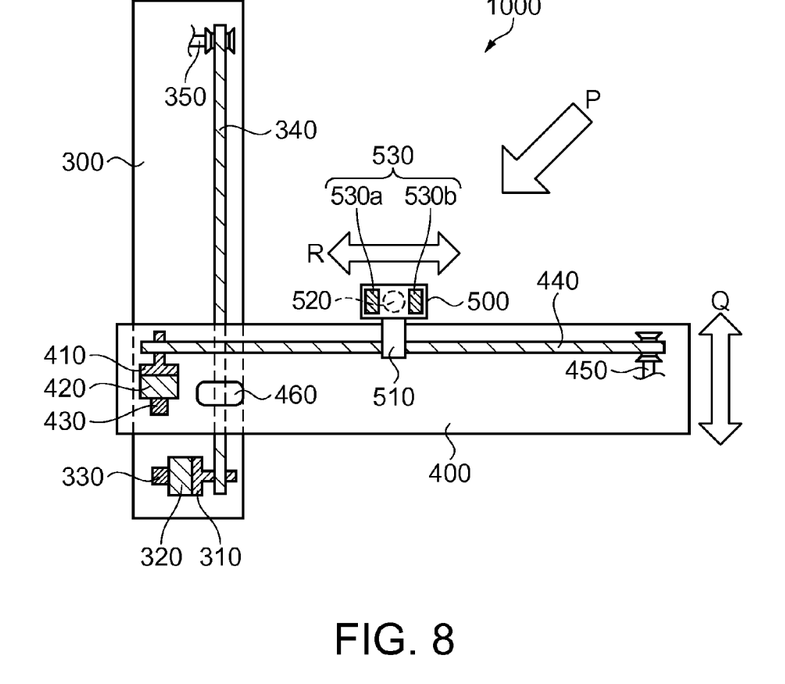
FIG. 8 is a schematic plan view of a robotic device according to a third embodiment.
Figure 9:
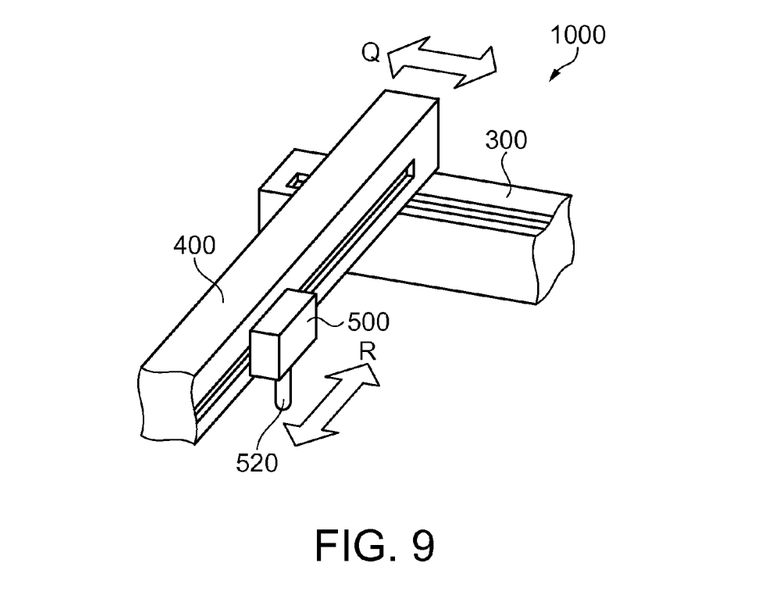
FIG. 9 is a schematic perspective view of the robotic device according to the third embodiment.

FIG. 8 is a schematic plan view of a robotic device 1000 according to the third embodiment. Further, FIG. 9 is a schematic diagram of an exterior appearance viewed from the direction of the arrow P in FIG. 8. In order for making the configuration of the robotic device 1000 clear, illustration of, for example, a housing for covering the principal part is omitted from FIG. 8. The robotic device 1000 is provided with a base body 300 fixed to, for example, a work table or a floor, an arm 400 movably attached to the base body 300, and a work holding device 500 attached movably to the arm 400 and having a work holding section 520 for holding a working tool or a work object.

The base body 300 is provided with a base body actuator 320, a base body torque transmission device 310 for transmitting the torque of the base body actuator 320 at a predetermined reduction ratio, an arm driving belt 340 coupled to the rotational shaft of the base body torque transmission device 310, and a base body pulley 350 for pulling and rotatably fixing the arm driving belt 340. Further, the base body actuator 320 is provided with an angle sensor 330 for detecting the rotational angle.

The arm 400 is provided with an arm actuator 420, an arm torque transmission device 410 for transmitting the torque of the arm actuator 420 at a predetermined reduction ratio, a work holding device driving belt 440 coupled to the rotational shaft of the arm torque transmission device 410, and an arm pulley 450 for pulling and rotatably fixing the work holding device driving belt 440. Further, the arm actuator 420 is provided with an angle sensor 430 for detecting the rotational angle.

The work holding device 500 movably attached to the arm 400 is provided with an inertial sensor 530 having at least two acceleration sensors 530a, 530b, and a work holding section 520 is driven by a driving device not shown.

Further, the arm 400 is provided with an arm fixing device 460 to be fixed to the arm driving belt 340 provided to the base body 300, and the arm 400 is operated in accordance with the operation of the arm driving belt 340. Further, the work holding device 500 is provided with a work holding device fixing device 510 fixed to the work holding device driving belt 440 provided to the arm 400, and the work holding device 500 is operated in accordance with the operation of the work holding device driving belt 440.

The robotic device 1000 thus configured is capable of moving the arm 400 and the work holding device 500 in the directions indicated by the arrows Q, R shown in FIGS. 8 and 9 to thereby make the arm 400 and the work holding device 500 operate at a predetermined position.

Figure 10:
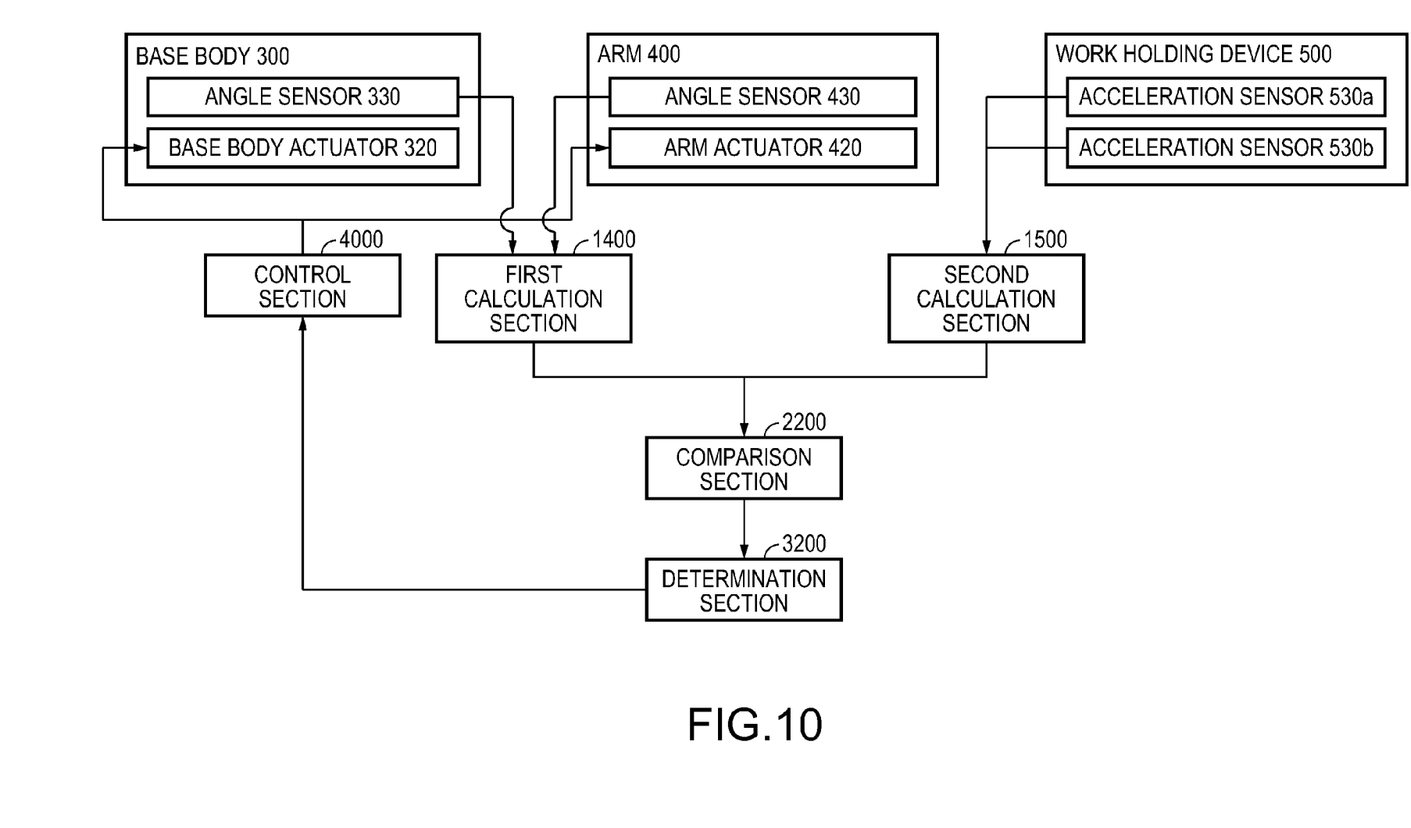
FIG. 10 is a block diagram of failure detection of the robotic device according to the third embodiment.

FIG. 10 is a block diagram according to the third embodiment. A first calculation section 1400 converts the detection data of the base body actuator 320 and the arm actuator 420 detected by the angle sensors 330, 430 into the rotational angle $\theta_a$ of the base body actuator 320 and the rotational angle $\theta_b$ of the arm actuator 420, respectively. The second-order temporal differentiation is performed on the rotational angles $\theta_a$, $\theta_b$ thus obtained to thereby calculate the rotational angular accelerations as follows.

$$d^2\theta_a/dt^2 = \omega_a' \quad (3\text{-}1)$$

$$d^2\theta_b/dt^2 = \omega_b' \quad (3\text{-}2)$$

Assuming that the conversion coefficient for converting the rotational angle of the base body actuator 320 into the moving length of the arm driving belt 340 via the base body torque transmission device 310 is K1, the moving acceleration $\beta_a$ of the arm driving belt 340 is obtained as follows.

$$\beta_a = \omega_a'/K1 \quad (3\text{-}3)$$

Similarly, assuming that the conversion coefficient for converting the rotational angle of the arm actuator 420 into the moving length of the work holding device driving belt 440 via the arm torque transmission device 410 is K2, the moving acceleration $\beta_b$ of the work holding device driving belt 440 is obtained as follows.

$$\beta_b = \omega_b'/K2 \quad (3\text{-}4)$$

A second calculation section 1500 calculates the acceleration from the data detected by the acceleration sensors 530a, 530b included in the inertial sensor 530 provided to the work holding device 500. Here, in the case in which the acceleration sensor 530a detects, for example, the acceleration component in the Q direction shown in FIG. 9, the other acceleration sensor 530b is arranged so as to detect the acceleration in the R direction. Alternatively, it is also possible to use the detection data in the two axes directions perpendicular to each other by using a triaxial acceleration sensor.

The acceleration $\alpha_a$ obtained by converting the detection data in the Q direction of the acceleration sensor 530a and the acceleration $\alpha_b$ obtained by converting the detection data in the R direction of the acceleration sensor 530b.

A comparison section 2200 compares the moving accelerations $\beta_a$, $\beta_b$ of the driving belt obtained by the first calculation section 1400, and the accelerations $\alpha_a$, $\alpha_b$ of the work holding device 500 obtained by the second calculation section 1500 with each other. The comparison in the comparison section 2200 is for calculating the absolute values of the acceleration differences, namely $|\alpha_a-\beta_a|$ in the Q direction shown in FIG. 8 and $|\alpha_b-\beta_b|$ in the R direction.

A determination section 3200 determines that the corresponding inertial sensor is at fault if the comparison result output from the comparison section 2200 described above, namely the absolute value of the acceleration difference, is larger than a threshold value. Here, the threshold value will be explained.

Firstly, the threshold value A1 for the failure determination of the acceleration sensor 530a is set as follows. The load, which is 120% of the maximum load, is provided to the robotic device 1000, and the work holding device 500 is operated in the Q direction shown in FIG. 8 at acceleration, which is 120% of the maximum allowable acceleration of the work holding device in the Q direction with the maximum load. The difference between the acceleration $\alpha_{at}$ of the work holding device 500 obtained from the output value of the acceleration sensor 530a and the moving acceleration $\beta_{at}$ of the arm driving belt 340 calculated from the rotational angle of the angle sensor 330 provided to the base body actuator 320 for moving the work holding device 500 in the Q direction at the time point when T hour has elapsed from the beginning of the operation is obtained. The value two times of the maximum value of the absolute value of the difference between the acceleration $\alpha_{at}$ and the moving acceleration $\beta_{at}$ is set as the threshold value A1. In other words, the threshold value A1 is obtained as follows.

$$A1=2\times(|\alpha_{at}-\beta_{at}|)_{max} \quad (3\text{-}5)$$

Similarly, regarding the threshold value A2 for the failure determination of the acceleration sensor 530b, the load, which is 120% of the maximum load, is provided to the robotic device 1000, and the work holding device 500 is operated in the R direction shown in FIG. 8 at acceleration, which is 120% of the maximum allowable acceleration of the work holding device in the R direction with the maximum load. The difference between the acceleration $\alpha_{bt}$ of the work holding device 500 obtained from the output value of the acceleration sensor 530b and the moving acceleration $\beta_{bt}$ of the work holding device driving belt 440 calculated from the rotational angle of the angle sensor 430 provided to the arm actuator 420 for moving the work holding device 500 in the R direction at the time point when T hour has elapsed from the beginning of the operation is obtained. The value two times of the maximum value of the absolute value of the difference between the acceleration $\alpha_{bt}$ and the moving acceleration $\beta_{bt}$ is set as the threshold value A2. In other words, the threshold value A2 is obtained as follows.

$$A2=2\times(|\alpha_{bt}-\beta_{bt}|)_{max} \quad (3\text{-}6)$$

The determination section 3200 performs the failure determination using the threshold values A1, A2 obtained by the formulas 3-5, 3-6 and the comparison result obtained by the comparison section 2200. Regarding the acceleration sensor 530a, it is determined that the acceleration sensor 530a is at fault when $|\alpha_a-\beta_a|>A1$ becomes true. Regarding the acceleration sensor 530b, it is determined that the acceleration sensor 530b is at fault when $|\alpha_b-\beta_b|>A2$ becomes true.

If it is determined in the determination section 3200 that the acceleration sensor 530a or the acceleration sensor 530b is at fault, the instruction of halting the base body actuator 320 or the arm actuator 420 is transmitted to the control section 4000, and the control section 4000 halts the base body actuator 320 or the arm actuator 420. Thus, the robotic device 1000 can be halted safely.

Then, a control method according to the third embodiment will be explained. The flowchart showing the control method according to the third embodiment is substantially the same as in the first embodiment, and therefore, the flowchart shown in FIG. 3 can be applied. Therefore, the detailed explanation for the part the same as the first embodiment is omitted, and the point in which the third embodiment is different from the first embodiment will be explained.

In the control method according to the third embodiment, in the first calculation step (S111), the moving acceleration $\beta_a$ of the arm driving belt 340 is calculated based on the rotational angle data from the angle sensor 330 provided to the base body actuator 320, and the moving acceleration Pb of the work holding device driving belt 440 is calculated based on the rotational angle data from the angle sensor 430 provided to the arm actuator 420, and the process proceeds to the comparison step (S120).

In the second calculation step (S112), the accelerations $\alpha_a$, $\alpha_b$ are calculated from the data detected by the acceleration sensors 530a, 530b included in the inertial sensor 530 provided to the work holding device 500, and the process proceeds to the comparison step (S120).

Then, the process proceeds to the comparison step (S120). In the comparison step (S120), the values of $|\alpha_a-\beta_a|$ and $|\alpha_b-\beta_b|$ are output to the determination step (S130) as the comparison result using the acceleration values obtained in the first calculation step (S111) and the second calculation step (S112).

Then, the process proceeds to the determination step (S130). In the determination step (S130), it is determined whether or not the comparison results input from the comparison step (S120) are larger than the threshold values A1, A2 previously stored in a storage device not shown, respectively. If the determination result is "YES," namely, if the comparison results from the comparison step (S120) are larger than the respective threshold values, it is determined that the corresponding acceleration sensors are at fault.

Specifically, if $|\alpha_a-\beta_a|>A1$ or $|\alpha_b-\beta_b|>A2$ is true, it is determined that the acceleration sensor 530a or the acceleration sensor 530b is at fault.

If the fault judgment is made, in other words, if the determination is "YES" in the determination step (S130), the process proceeds to the halt instruction step (S140). In the halt instruction step (S140), the control section 4000 outputs the instruction for halting the operation to the base body actuator 320 and the arm actuator 420, and then the robotic device 1000 halts.

As described above, since the moving acceleration of the driving belt obtained from the detection data of the angle sensor of the actuator provided to the base body and the arm is used as the determination standard of the failure of the inertial sensor, the determination standard itself is also a value varying in accordance with the action of the work holding device 500, and the failure determination is performed using a more realistic action, and therefore, the accurate failure determination of the acceleration sensors becomes possible. Thus, it becomes possible to surely avoid the danger due to the runaway of the robotic device, assure the stable operation of the robotic device due to early normalization, and keep the product quality high.

What is claimed is:

1. A robotic device comprising:
a base;
an arm rotatably connected to the base;
an angle sensor operably associated with the arm and configured to detect a rotational angle of the arm;
an inertial sensor attached to the arm;
a first calculation section calculating a first angular velocity of the arm based on output from the angle sensor;
a second calculation section calculating a second angular velocity of the arm based on output from the inertial sensor;
a comparison section calculating a difference between the first angular velocity and the second angular velocity; and
a failure determination section determining the inertial sensor is at fault when an absolute value of the difference between the first angular velocity and the second angular velocity calculated by the comparison section is greater than a predetermined threshold value, wherein the arm stops moving based on the difference.

2. The robotic device according to claim 1, wherein the arm stops moving when an absolute value of the difference is larger than a predetermined threshold value.

3. A robotic device comprising:
a base;
an arm rotatably connected to the base;
an angle sensor operably associated with the arm and configured to detect a rotational angle of the arm;
an inertial sensor attached to the arm;
a first calculation section calculating a first angular acceleration of the arm based on output from the angle sensor;
a second calculation section calculating a second angular acceleration of the arm based on output from the inertial sensor;
a comparison section calculating a difference between the first angular acceleration and the second angular acceleration; and
a failure determination section determining the inertial sensor is at fault when an absolute value of the difference between the first angular acceleration and the second angular acceleration calculated by the comparison section is greater than a predetermined threshold value, wherein the arm stops moving based on the difference.

4. The robotic device according to claim 3, wherein the arm stops moving when the absolute value of the difference is larger than the predetermined threshold value.

* * * * *